(12) United States Patent
Zaitsu et al.

(10) Patent No.: US 6,909,566 B1
(45) Date of Patent: Jun. 21, 2005

(54) MAGNETIC RECORDING/REPRODUCING DEVICE

(75) Inventors: Hideki Zaitsu, Kokubunji (JP);
Takehiko Hamaguchi, Fuchu (JP);
Futoshi Tomiyama, Hachioji (JP)

(73) Assignee: Hitachi Global Storage Technologies Japan, Ltd., Kanagawa (JP)

(*) Notice: Subject to any disclaimer, the term of this patent is extended or adjusted under 35 U.S.C. 154(b) by 0 days.

(21) Appl. No.: 10/130,953

(22) PCT Filed: Feb. 10, 2000

(86) PCT No.: PCT/JP00/00746
§ 371 (c)(1),
(2), (4) Date: May 24, 2002

(87) PCT Pub. No.: WO01/59767
PCT Pub. Date: Aug. 16, 2001

(51) Int. Cl.$^7$ .............................................. G11B 27/36
(52) U.S. Cl. .............................. 360/31; 360/48; 360/55
(58) Field of Search .......................... 360/77.14, 73.11, 360/72.1, 39, 49, 31, 48, 55

(56) References Cited

U.S. PATENT DOCUMENTS 6,118,604 A * 9/2000 Duffy ........................... 360/48

6,141,177 A * 10/2000 Yatomi ........................ 360/55

FOREIGN PATENT DOCUMENTS

| JP | 50-109383 | 8/1975 |
| JP | 59-188875 | 10/1984 |
| JP | 4-103023 | 4/1992 |
| JP | 5-73872 | 3/1993 |
| JP | 5-94601 | 4/1993 |

* cited by examiner

*Primary Examiner*—David Hudspeth
(74) *Attorney, Agent, or Firm*—Mattingly, Stanger, Malur & Brundidge, P.C.

(57) ABSTRACT

The invention relates to a magnetic recording/reproducing device in which a reproduce head is positioned where the crosstalk between adjacent tracks in a magnetic disk is minimized to maintain an adequate transfer rate in a system involving great crosstalk. The removal of crosstalk ensures the reproduction of the recorded data and thus increases the reliability of the magnetic recording/reproducing device. The magnetic recording/reproducing device according to this invention includes a magnetic disk on which a plurality of tracks are concentrically formed, and data are recorded at different frequencies on adjacent tracks.

3 Claims, 16 Drawing Sheets

MAGNETIC RECORDING/REPRODUCING DEVICE

TECHNICAL FIELD

The present invention relates to a magnetic recording/reproducing apparatus capable of reducing influences of crosstalks between adjacent tracks in a magnetic recording medium, which has functions to detect the crosstalks, to control a head position and to remove crosstalk components in a read back signal.

BACKGROUND ART

Design of a magnetic disk device has heretofore been made so as not to produce problems of crosstalks by determining a write head track width, a read head track width and an erase and width properly. Particularly, the read head track width must be made small to suppress the crosstalks. However, the track density becomes increasingly higher, and it is more difficult to narrow the read head track width from the viewpoint of a head manufacturing and the improvement of read head sensitivity. Accordingly, it is forecasted that it becomes difficult in the future to suppress the crosstalk to be sufficiently low. If the crosstalk becomes significant, serious problems including a decrease in a transfer speed due to frequent occurrence of retry, the occurrence of reproducing incapability situation and the like are occurred. Therefore, countermeasures for the crosstalk is an important subject from now on.

As a conventional crosstalk reduction method until now, enumerated are an azimuth recording disclosed in JP-A-5-73872, a pattern disk disclosed in JP-A-4-103023, a multi-head recording and reproducing manner with use of arranging a plurality of recording and reproducing elements in a track width direction, and an optical-assisted recording and reproducing manner with use of controlling temperature of a medium by light so as to record and reproduce a part on which the light is irradiated.

DISCLOSURE OF INVENTION

The above described conventional invention achieves a reduction of crosstalk by greatly changing structures of a head and a medium, a recording/reproducing principle and the like, which belong to the background arts. Therefore, to realize the reduction of crosstalk, the structure of conventional magnetic disk device must be largely changed. Accordingly, an object of the present invention is to provide a method for reducing the crosstalk without changing the structures of the head and the medium, the recording/reproducing principle and the like, which belong to the background arts. The object of the present invention is also to provide an apparatus having a function to reduce the crosstalk.

To prevent the decrease of a transfer speed due to the crosstalk, a read head position control is performed in the present invention so as to reduce the crosstalk. Furthermore, to remove a situation where the reproducing is impossible owing to the crosstalk, decoding is carried out by removing crosstalk component from a read back signal.

In order to embody the foregoing solving means, it is necessary to know magnitudes of the crosstalk components. To know the magnitudes of the crosstalk components, a PLL (Phase Locked Loop) pattern read back signal undergoes a separation of a frequency by changing a write frequency between adjacent tracks. Since the PLL pattern is a constant frequency write pattern which depends on the write frequency, the signal component of each track appears as a peak corresponding to its recording frequency. Thus, it is possible to detect a crosstalk amount. Based on the crosstalk amount detected in the above described manner, the position of the read head is controlled so that the crosstalk amounts from the left and right tracks adjacent to each other are equal, whereby it is possible to reproduce data at the read head position showing the smallest crosstalk.

When the crosstalk is large and the reproducing is impossible, the reproducing is performed for a read-purposed track and both adjacent tracks of the read-purposed track, and a crosstalk component of a read back signal for the read-purposed track is obtained as a multiplication value of both the adjacent tracks read back signals and a detected crosstalk amount. The multiplication value is then subtracted from the read back signal waveform of read-purposed track to thereby remove the crosstalk.

Moreover, by changing a frequency relative to the adjacent tracks for only the PLL pattern, the crosstalk can be removed.

BEST MODE FOR CARRYING OUT THE INVENTION (Embodiment 1)

Figure 1:
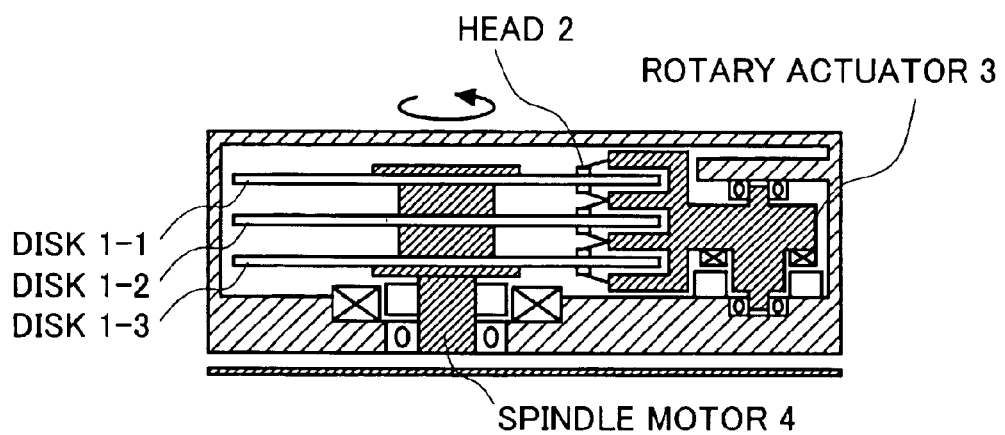
FIG. 1 is a side view showing a magnetic disk device.
Figure 2:
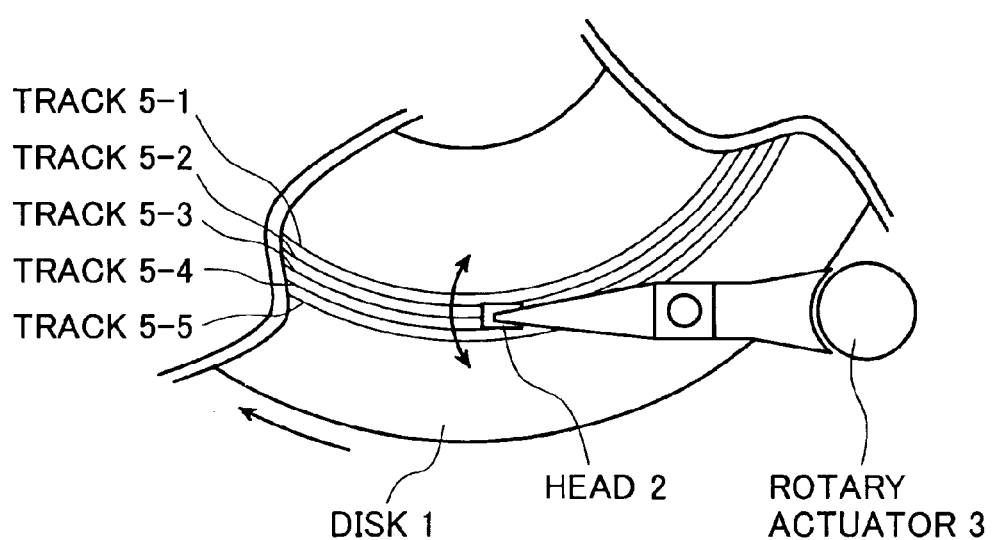
FIG. 2 is a schematic view illustrating a recording method performed by the magnetic disk device.
Figure 3:
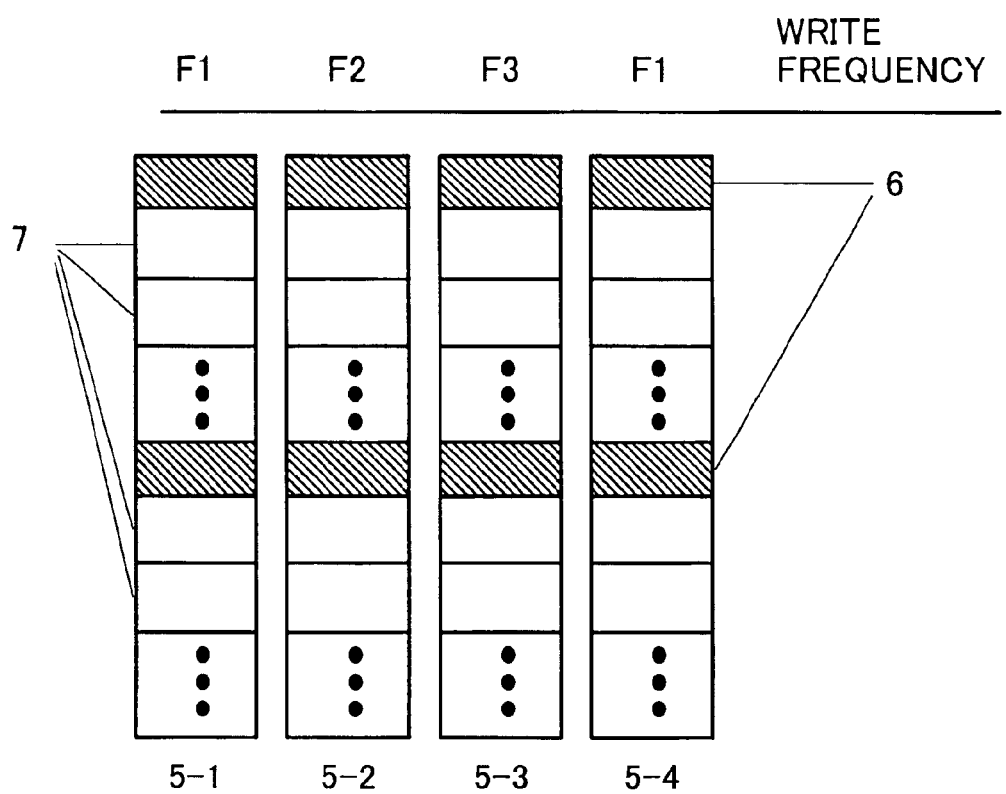
FIG. 3 is a drawing showing a setting example of a write frequency of an embodiment 1.

The present invention will be described while taking the case of a magnetic disk device. A side view of the magnetic disk device is shown in FIG. 1. The magnetic disk device has disk (1-1 to 1-3, a head (2), a rotary actuator (3) and a spindle motor (4). The disk (1) is rotated by the spindle motor (4), and recording of data onto the disk (1) and reproducing of the data recorded are performed by the head (2). The head (2) is driven by the rotary actuator (3), and positioned at an optional position on the disk (1). For this reason, a plurality of tracks (5-1 to 5-5) exist on the disk as shown in FIG. 2, and the head (2) is moved onto any track by the rotary type actuator (3), thus performing the recording/reproducing operation. Servo sectors (6) in which recorded information for positioning the head exist discretely as shown in FIG. 3, and data sectors (7) for recording data exist plurality between the servo sectors (6). The disk is usually divided into several zones along its radius direction. Although the write frequency differs among the zones, the write frequency of each track is constant in the same zone. Contrary to this, in the present invention, different data write frequencies are used between the adjacent tracks. For example, with use of three frequencies (F1, F2, F3) as shown in FIG. 3, the write frequencies are always set in an arbitrary track (5-2) and adjacent tracks (5-1, 5-3) enclosing the arbitrary track so as to be different frequencies each other.

Figure 4:
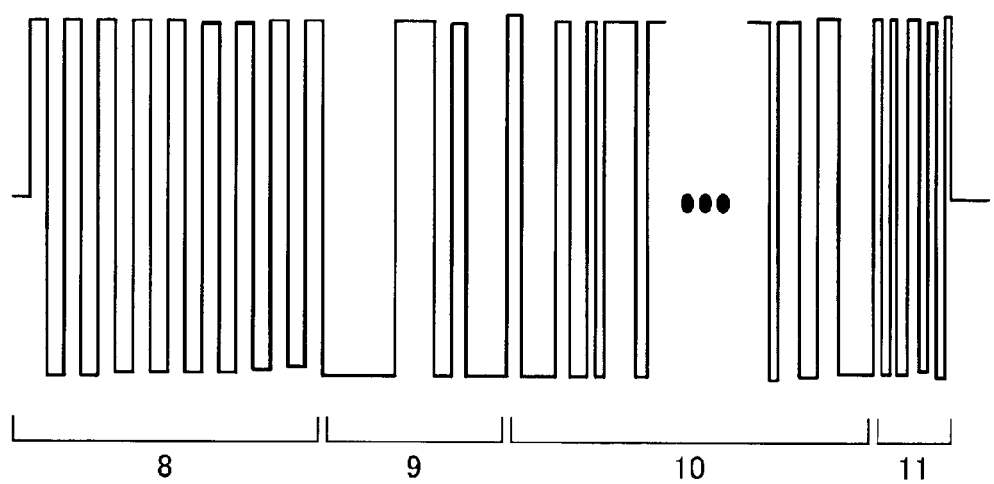
FIG. 4 is a drawing illustrating a write current waveform in a data sector.
Figure 5:
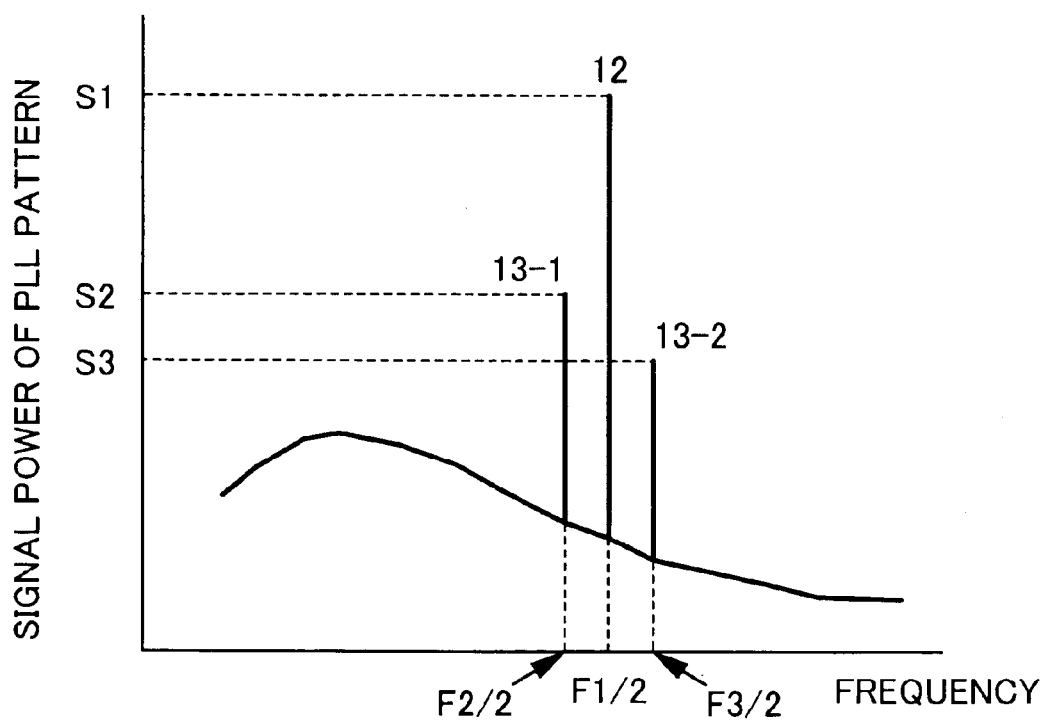
FIG. 5 is a drawing showing a PLL pattern reproducing signal in the embodiment 1.
Figure 6:
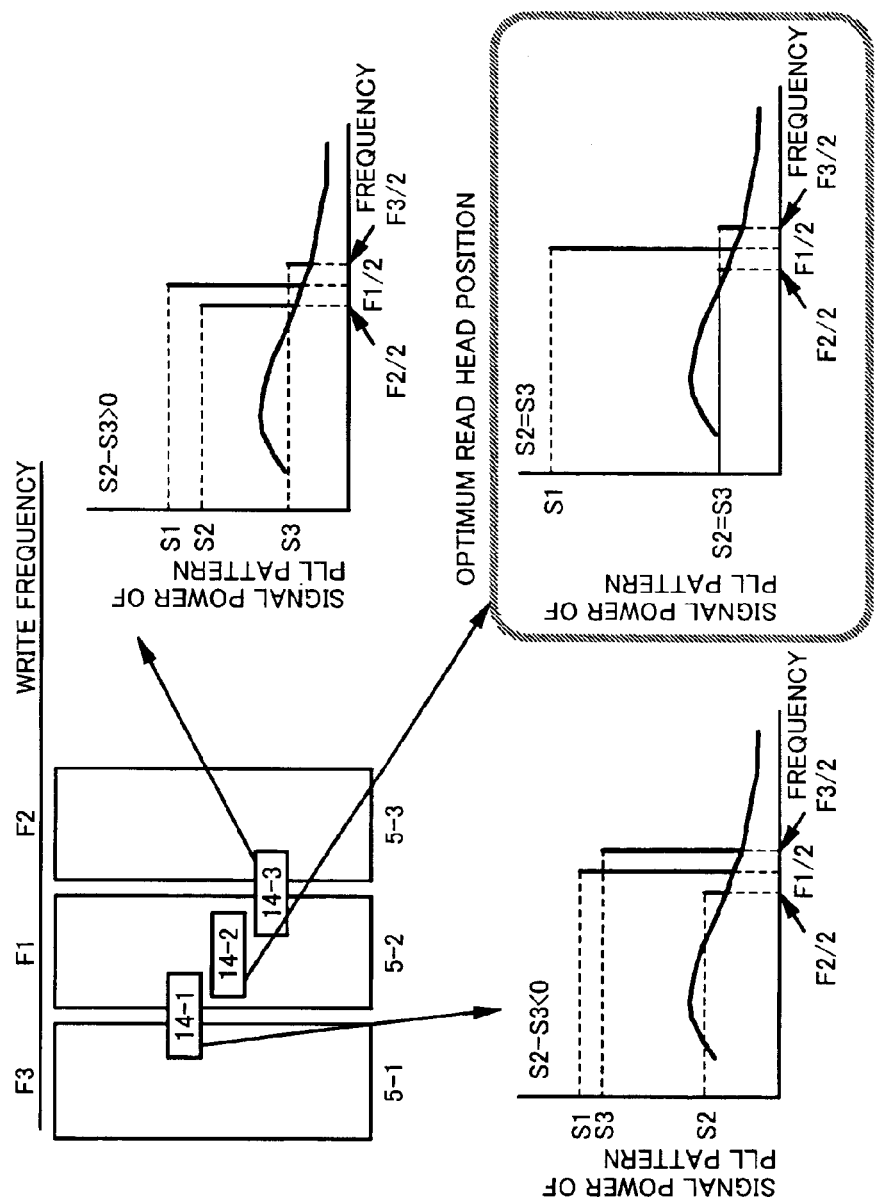
FIG. 6 is a drawing illustrating a head position control method of the present invention.

A write current waveform of the data sector is shown in FIG. 4. Generally, the data sector is constituted by a PLL pattern (8), an address mark (9), data (10), a pad (11) and the like. The PLL pattern (9) is recorded by a frequency depending on the write frequency, which is generally a half of the write frequency. When the write frequency of the read-purposed track is F1 and the frequency of PLL pattern is a half of the write frequency, spectrum of a read back signal of the PLL pattern has peaks (12, 13-1 and 13-2) at the PLL pattern frequency (F1/2) of the read-purposed track and the PLL pattern frequency (F2/2, F3/2) of the adjacent tracks, as shown in FIG. 5. Herein, when the respective peak values are defined as S1, S2 and S3, the reproducing in which influences of the crosstalk are reduced becomes possible by controlling the position of read head so that a crosstalk amount (S2+S3)/S1 becomes minimum. The direction to which the head is to be moved can be known from the magnitudes of the frequency peak values S2 and S3. Acquisition of information relating to the direction to which the head is to be moved from, for example, S2−S3 is considered. When the read head (14) is located at the position of 14-1 in FIG. 6, S2−S3<0 is made. At this time, by moving the read head from the position of 14-1 to the position of 14-2 in the right direction, it is possible to satisfy S2−S3 =0, and the reproducing at this position is most advantageous in terms of preventing the crosstalk. When the read head is located at the position of 14-3, S2−S3>0 is made, and at this time the read head is moved to the left direction.

Figure 7:
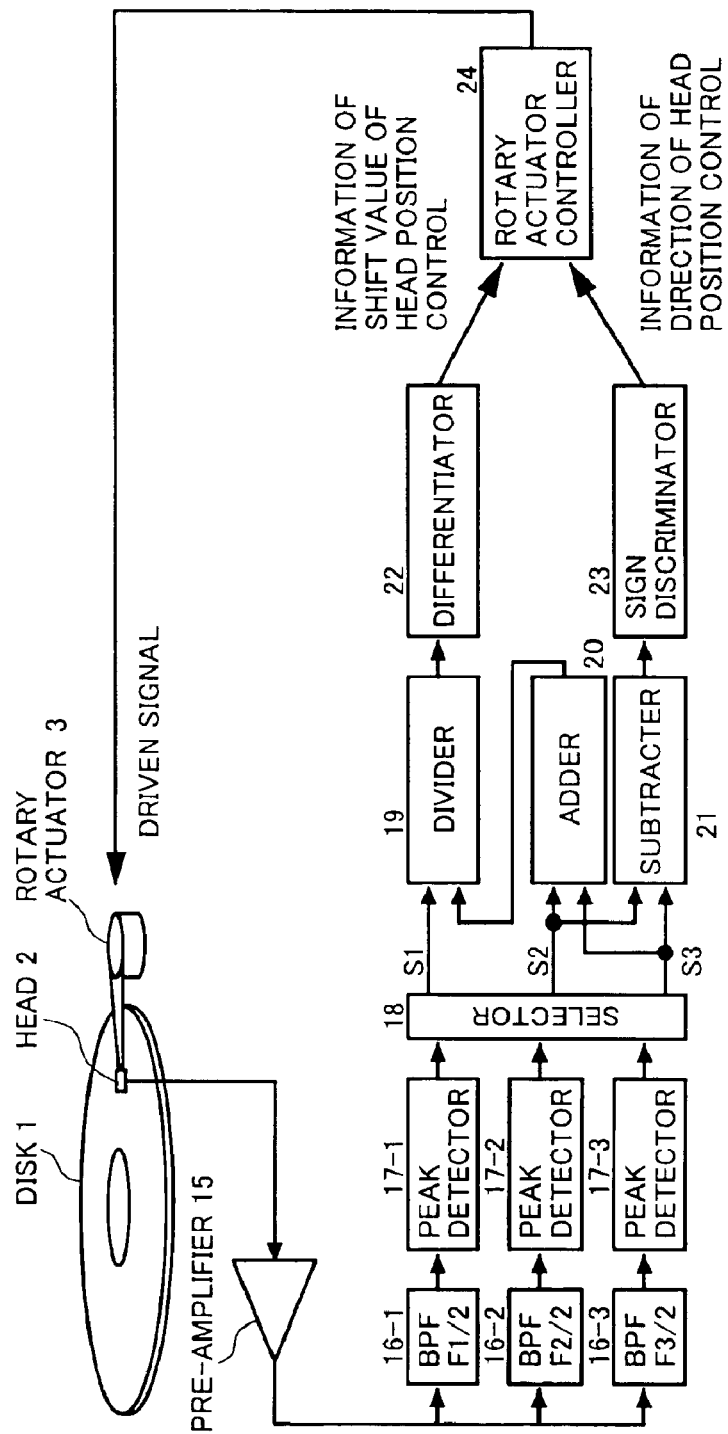
FIG. 7 is a diagram illustrating a magnetic disk device of the embodiment 1 and a method of operating the same.

A constitutional example of a rotary actuator control system for realizing this embodiment is shown in FIG. 7. The position of a head is principally controlled by information relating to servo sectors, and a micro-motion control of the head between the servo sectors is performed by use of the technique of the present invention. With respect to the reproducing signal, the reproducing signal of the PLL pattern through the head amplifier (15) is subjected to a separation of a frequency by band pass filters (16-1 to 16-3) of transmission frequencies F1/2, F2/2, F3/2. Signal intensities S1 of frequency components are detected by peak detectors (17-1 to 17-3), respectively, and a signal intensity S1 of the read-purposed track and crosstalk intensities, S2 and S3 of the left and right adjacent tracks are selected by the selector (18). Information of a direction of a head position control is generated by a subtracter (21) and a sign discriminator (23). The sign discriminator (23) serves to binarize an input signal. The crosstalk amount is calculated by an adder and a divider, and information of a shift amount of the head is obtained by use of a differentiator. Based on the information of head shift direction and head shift amount, a rotary actuator controller (24) performs a position control of the head.

(Embodiment 2)

Figure 8:
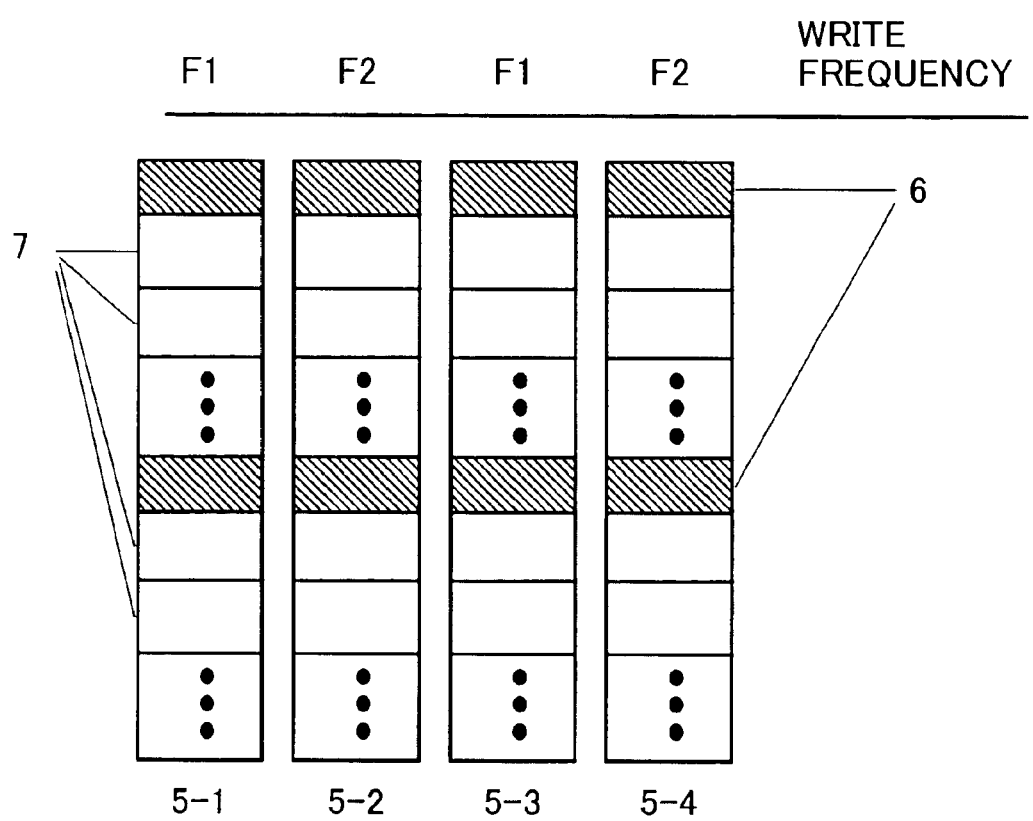
FIG. 8 is a drawing showing a setting example of a write frequency of an embodiment 2.
Figure 9:
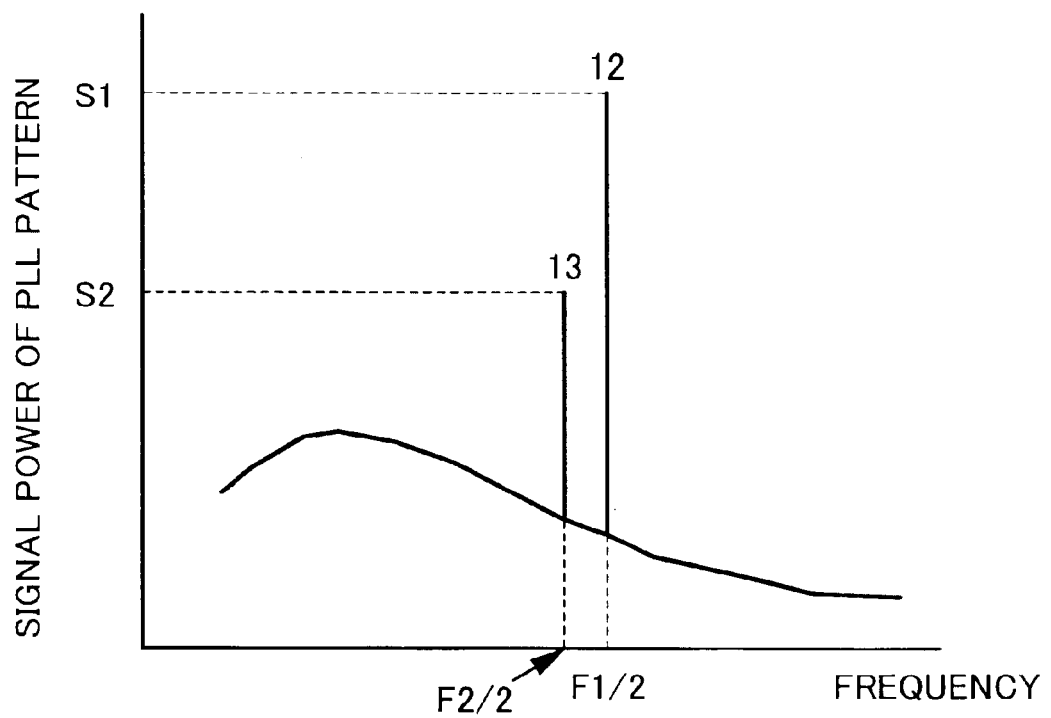
FIG. 9 is a drawing illustrating a PLL pattern reproducing signal in the embodiment 2.
Figure 10:
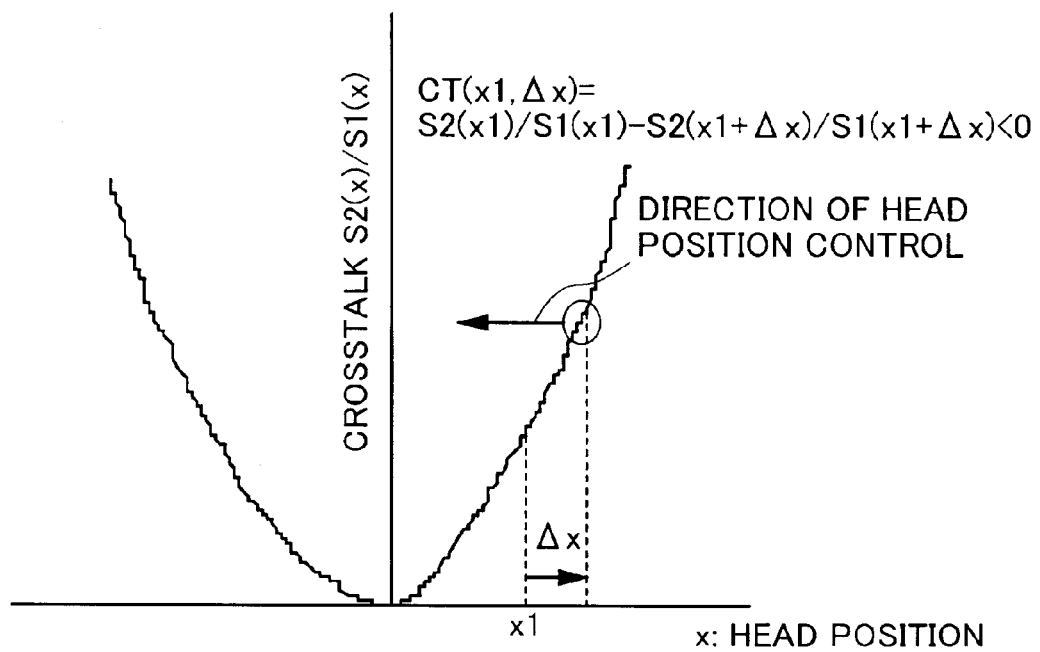
FIG. 10 is a drawing showing a relation between a head position and a crosstalk value of the embodiment 2.

The write frequency is changed for each one track as shown in FIG. 8. At this time, spectrum of a read back signal of the PLL pattern has frequency peaks (12, 13), respectively, at the positions corresponding to the PLL pattern frequency (F1/2) of the read-purposed track (5-3) and the PLL pattern frequency (F2/2) of the adjacent tracks (5-2, 5-4), as shown in FIG. 9. Herein, it is assumed that a position of the read head is x, an intensity of the read-purposed track signal at the position x is S1(x) and a crosstalk amount is S2(x). When a crosstalk value at this time is expressed by S2(x)S1(x), the relation between the position x of read head and the crosstalk value S2(x)S1(x) is illustrated so as to have a convex shape with a vertex directed downward as shown in FIG. 10. At the position of x1+Δx, the crosstalk value becomes S2(x1+Δx)/S1(x1+Δx). Assuming that S2(x1)/S1(x1)−S2(x1+Δx)/S1(x1+Δx) is equal to CT(x1, Δx), if CT(x1, Δx)>0 is satisfied when the read head moves from x1 to x1+Δx, the read head is further moved to the same direction as that from x1 to x1+Δx. Moreover, if CT(x, Δx)<0 is satisfied, the read head is moved to the direction reverse to that from x1 to x1+Δx. Thus, it is possible to position the read head at the best position in terms of preventing the crosstalk by use of the two data write frequencies.

Figure 11:
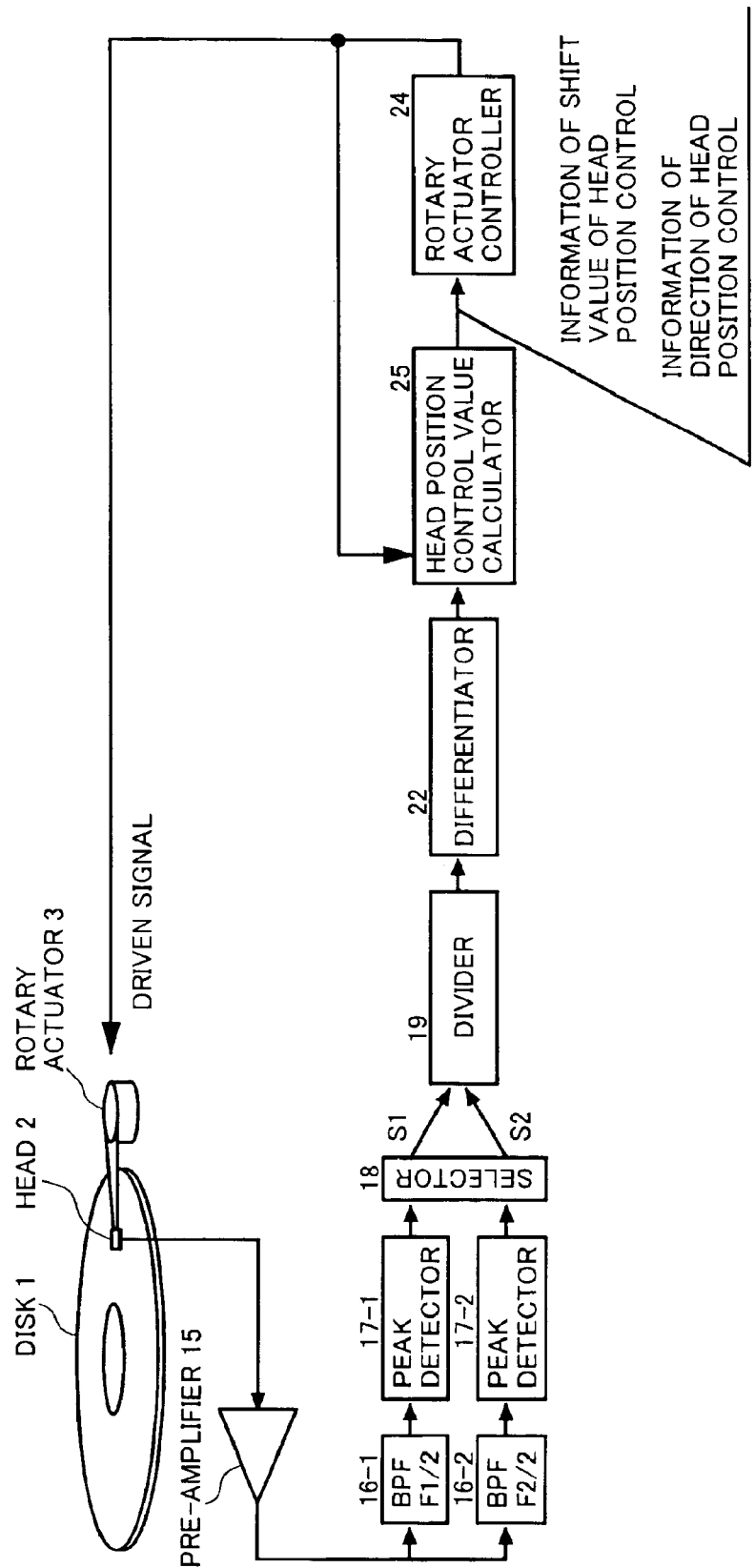
FIG. 11 is a diagram illustrating a magnetic disk device of the embodiment 2 and a method of operating the same.

A constitutional example of the rotary actuator control system to realize this embodiment is shown in FIG. 11. The position of head is controlled mainly by information of the servo sector, and a micro-motion control of the head between the servo sectors is performed by use of the technique of the present invention. With respect to the reproducing signal, the reproducing signal of the PLL pattern through the head amplifier (15) is subjected to a separation of a frequency by band pass filters (16-1, 16-2) of transmission frequencies F1/2 and F2/2. Signal intensities of frequency components are then detected by peak detectors (17-1, 17-2), respectively, and a signal intensity S1 of the/read-purposed track and a crosstalk intensity S2 of the adjacent tracks thereof are selected by the selector (18). Next, a crosstalk value is determined by a divider (19), and the change of crosstalk value is detected by a differentiator (22). Thereafter, an expression (CT(x1, ΔX)) is calculated based on the change of crosstalk value and the head drive signal in the past by a head position control value calculator (25), and information of a direction of a head position control and information of a shift value of a head position control are generated. The rotary actuator controller performs the position control of the head based on this.

(Embodiment 3)

Figure 12:
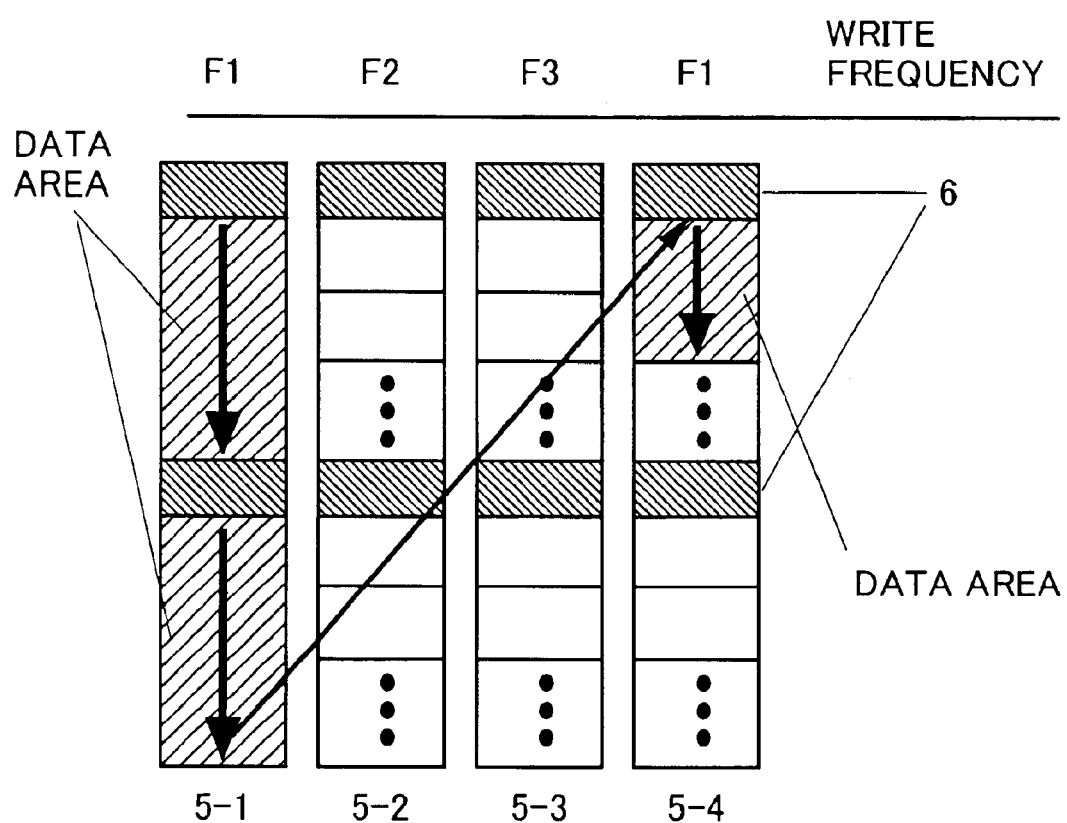
FIG. 12 is a drawing showing a recording order of an embodiment 3.

In the embodiments 1 and 2, when data straddling over the plurality of tracks is recorded, the head seeks tracks having the same write frequency, thus recording the data thereon. Specifically, in the case of the embodiment 1, when the first portion of the data Is recorded onto the track (5-1) recorded with the write frequency F1 and when all of a series of data cannot be recorded onto the track (5-1) as shown in FIG. 12, the head is allowed to seek the track (5-4) recorded with the same write frequency F1 as the track (5-1), and data which could not be recorded onto the track (5-1) is recorded onto the track (5-4).

Figure 13:
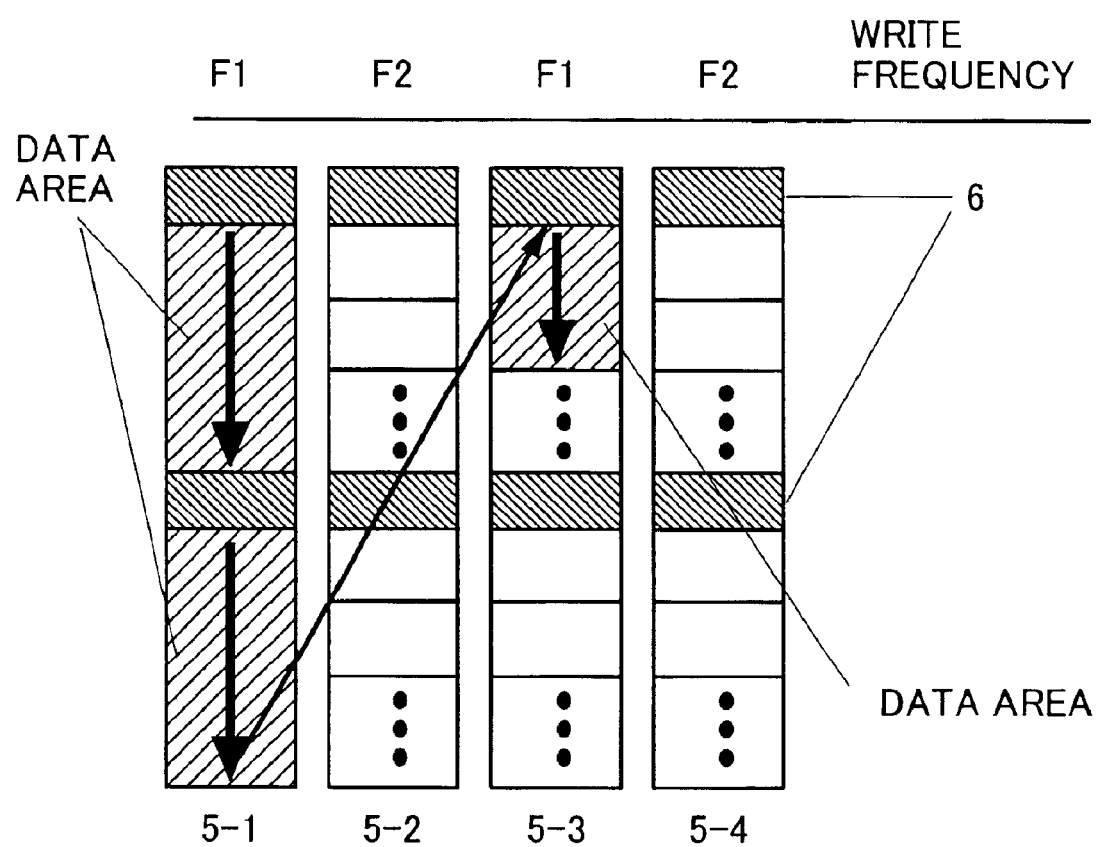
FIG. 13 is a drawing showing a recording order of an embodiment 3.

Furthermore, in the case of the embodiment 2, as shown in FIG. 13, the first portion of the data is recorded onto the track (5-1) recorded with the write frequency F1, all of a series of data is not recorded onto the track (5-1), the head is allowed to seek the track (5-3) recording with the same write frequency F1 as the track (5-1), and data which could not recorded onto the track (5-1) is recorded thereon.

By this embodiment, it is possible to prevent loss of a transfer speed due to switching between a write frequency and a read frequency in recording/reproducing the series of data over the plurality of tracks.

(Embodiment 4)

Figure 14:
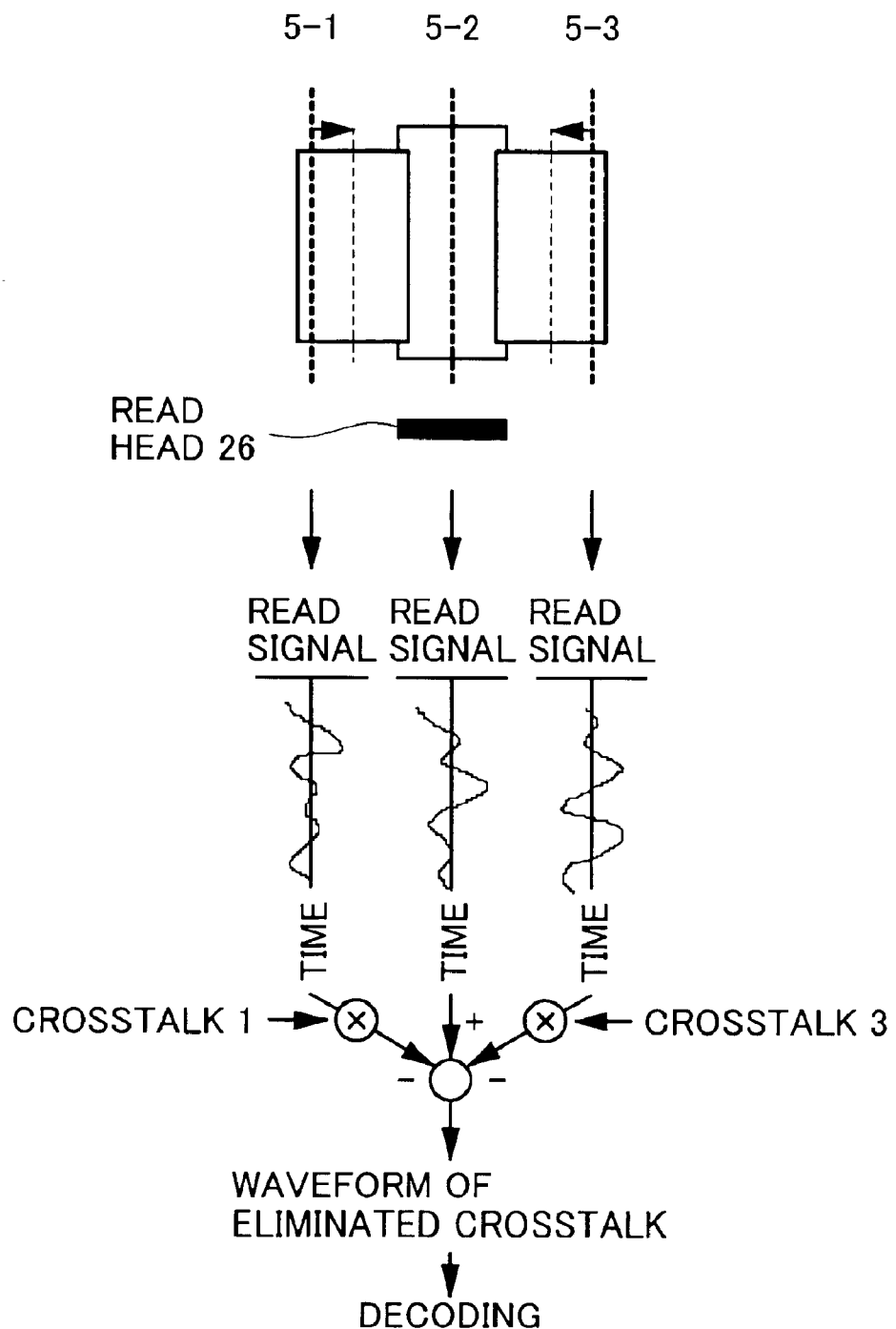
FIG. 14 is a drawing showing a principle of an embodiment 4.

When the reproducing cannot be reproduced because of large crosstalk, data decoding must be performed by removing crosstalk components from a read back signal. To perform the data decoding, it is necessary to know the crosstalk components in the read back signals of the read-purposed track. Crosstalk from the adjacent tracks is considered to be caused by damping of an amplitude of the read back signals of the adjacent tracks, and it is possible to estimate the crosstalk component based on the read back signals of the adjacent tracks and the crosstalk amount from the adjacent tracks at the time of the reproduction from the read-purposed track. A method for removing the crosstalk is shown in FIG. 14. The crosstalk component from each adjacent track can be obtained by multiplying the read back signals of each adjacent track and the crosstalk amount. The crosstalk component obtained in such a manner is subtracted from the read back signal of the read-purposed track, thus performing the removal of the crosstalk. In this embodiment, the signals of the adjacent tracks (5-1, 5-3) are sequentially reproduced, and the reproduced signals are temporarily stored in a RAM or the like. Thereafter, the read-purposed track (5-2) is reproduced, and the crosstalk amount is detected by the similar manner to the embodiments 1 and 2, and the crosstalk component is removed from the read back signals of the adjacent tracks that has been already stored, thus decoding the data.

Figure 15:
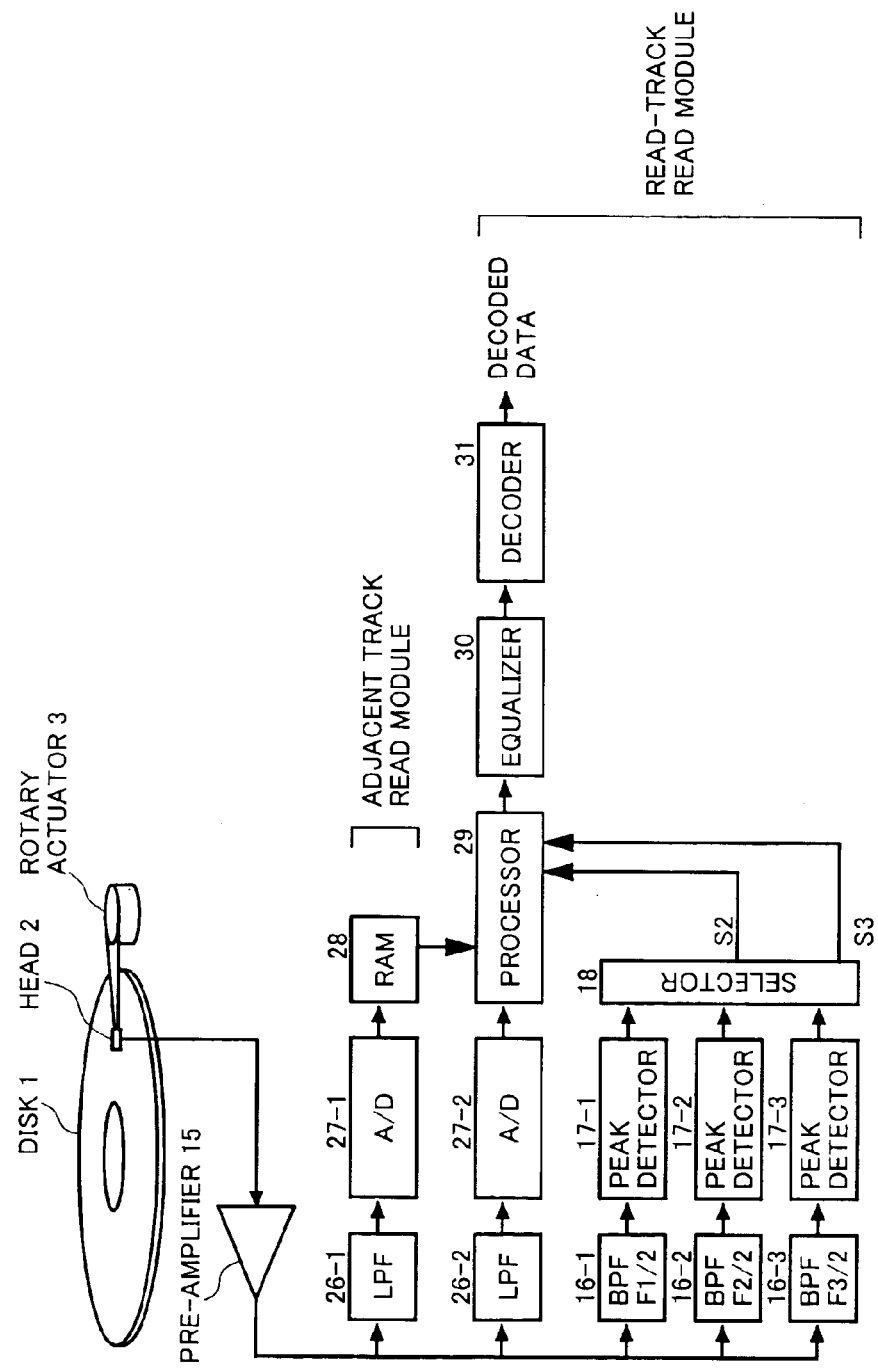
FIG. 15 is a diagram illustrating a magnetic disk device of the embodiment 4 and a method of operating the same.

An embodying example of this embodiment is shown in FIG. 15. When decoding error occurs, a head (2) is moved to the left adjacent track to perform the reproducing. The reproduced read back signal passes through a LPF (26-1) and is analog/digital converted by an A/D converter (27-1). The converted signal is temporarily stored in a RAM (28). Next, the head (2) is moved to the read-purposed track to perform the reproducing. The read back signal passes through a LPF (26-2), and is analog/digital converted by an A/D converter (27-2). At the same time, crosstalk amounts S2 and S3 from the adjacent tracks are detected by BPFs (16-1 to 16-3), peak detectors (17-1 to 17-3) and a sector (18). The pieces of information are processed by a processor (29) and the crosstalk component is removed. The signal from which the crosstalk component is removed passes through an equalizer (30) and undergoes data decoding by a decoder (31). By this embodiment, it is possible to avoid a situation where the reproducing is impossible owing to the crosstalk.

(Embodiment 5)

With the same constitution as FIG. 14, the crosstalk amount used in estimating the crosstalk component is assumed, and the crosstalk is removed under the assumed condition, thus decoding the data. Specifically, previously determined values as the crosstalk amounts 1 and 3 of FIG. 14 are used. At this time, if the decoding error does not occur, this is regarded as the decoding result. If the decoding error occurs, the assumed crosstalk amount is changed to another value, and the data is decoded. This operation is repeated until the decoding error vanishes or until a completion condition is satisfied.

Figure 16:
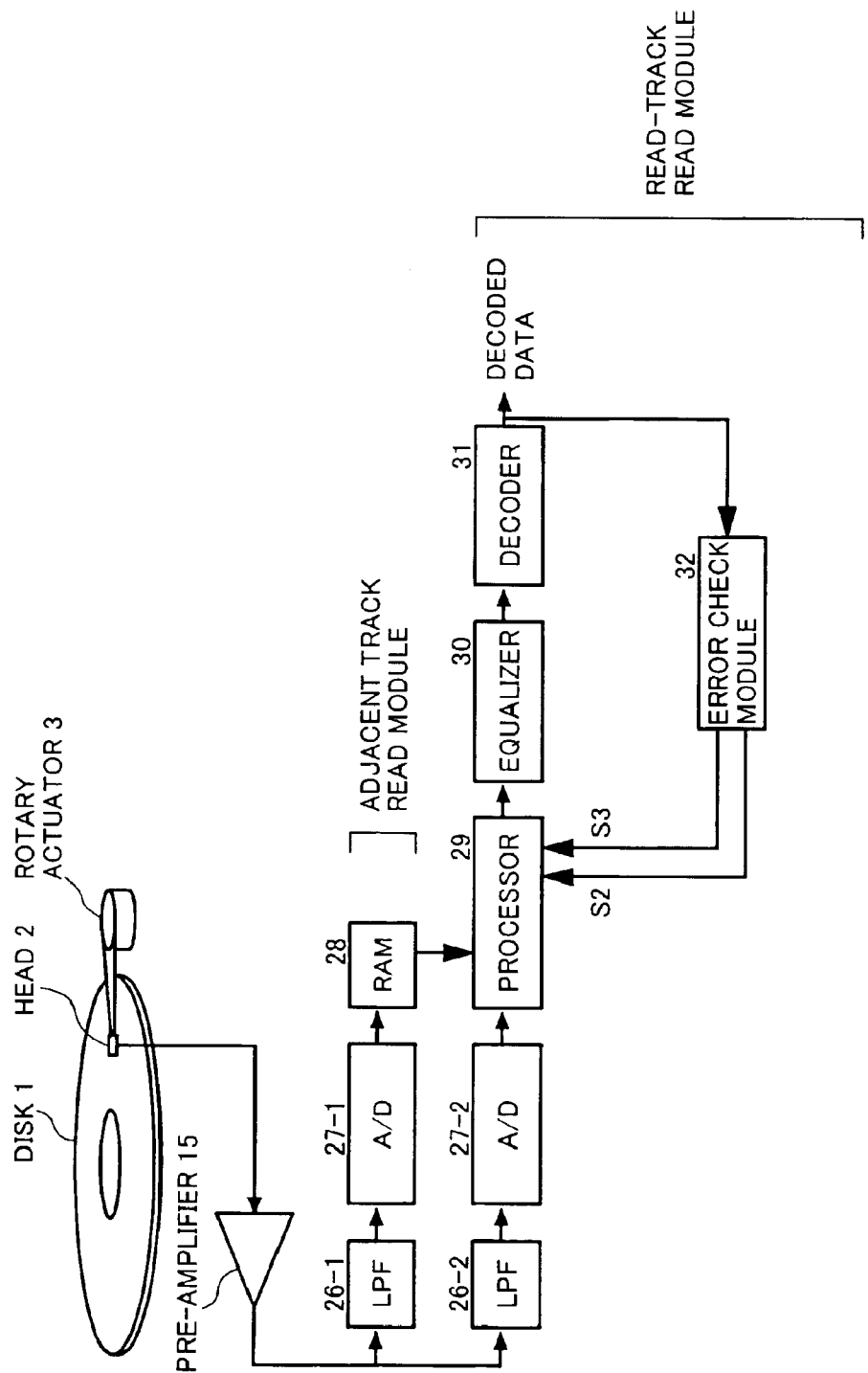
FIG. 16 is a diagram illustrating a magnetic disk device of the embodiment 5 and a method of operating the same.

An embodying example of this embodiment is shown in FIG. 16. When the decoding error occurs, the head (2) is moved to the left adjacent track to perform the reproducing. The reproduced read back signal passes through a LPF (26-1) and is analog/digital converted by an A/D converter (27-1). The converted signal is temporarily stored in a RAM (28). Next, the head (2) is moved to the right adjacent track, thus performing the reproducing. At this time, also this read back signal is temporarily stored in the RAM (28). Next, the head is moved to the read-purposed track, thus performing the reproducing. The read back signal passes through a LPF (26-2), and is analog/digital converted by an A/D converter (27-2). An error check module (32) sets crosstalk amounts S2 and S3 of the left and right adjacent tracks, and the read back signal is processed by a processor (29). Thus, the crosstalk component is removed. The signal from which the crosstalk component is removed passes through an equalizer (30), and then undergoes data decoding by a decoder (31). The decoded data undergoes error checking by CRC (Cyclic Redundancy Code) by use of the error check module (32). When the error occurs, the values of the crosstalk amounts S2 and S3 are changed, and then the same processing is repeatedly performed until the data is correctly decoded or all of the crosstalk values are changed within a previously set range. In this embodiment, the constitution is relatively simple in comparison to the embodiment 4, and it is not always necessary to change the write frequency for each track.

INDUSTRIAL APPLICABILITY

According to the present invention, since the read head can be positioned at the position where the crosstalk amount is minimum, it is possible to secure the transfer speed even in the system showing the large crosstalk. By the reproducing with the crosstalk removed, the occurrence of the situation where the recorded data is impossible to be reproduced can be prevented, realizing an improvement of reliability.

What is claimed is:

1. A magnetic recording/reproducing apparatus including a magnetic recording media forming a plurality of tracks concentrically, wherein a write frequency differs between adjacent tracks in the plurality of tracks, the magnetic recording media form concentrically the plurality of tracks each having data sectors having a PLL pattern and a data area, wherein signal components of the data write frequencies of a read-purposed track and the adjacent tracks of the read-purposed track are extracted from a read back signal of the PLL pattern, and wherein a crosstalk amount is detected from the adjacent tracks, the read-purposed track and both tracks adjacent to the read-purposed track are reproduced, wherein a crosstalk component is estimated in accordance with the crosstalk amount of the adjacent tracks and read back signals of the adjacent tracks, and wherein the crosstalk component is subtracted from a read back signal of the read-purposed track, reducing the crosstalk from the adjacent tracks, and a processing to reduce the crosstalk is performed by use of values of previously determined levels as a crosstalk amount necessary for reducing the crosstalk, and wherein when the reproduction is unable, the processing to reduce the crosstalk is performed by use of values of other crosstalk levels to perform the reproduction.

2. The magnetic recording/reproducing apparatus according to claim 1, wherein a read head position control is performed so that crosstalk from the adjacent tracks is small for a signal of the read-purposed track.

3. The magnetic recording/reproducing apparatus according to claim 2, wherein when data straddling over a plurality of tracks is recorded, recording is sequentially performed for the tracks corresponding to an identical write frequency.

* * * * *